(12) United States Patent
Yoshida et al.

(10) Patent No.: US 10,793,453 B2
(45) Date of Patent: Oct. 6, 2020

(54) WET PAINT BOOTH CIRCULATING WATER TREATMENT AGENT

(71) Applicant: KURITA WATER INDUSTRIES LTD., Tokyo (JP)

(72) Inventors: Tsuneyuki Yoshida, Tokyo (JP); Yuta Arimoto, Tokyo (JP); Yoshio Yasukawa, Tokyo (JP); Satoshi Onoue, Tochigi (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 59 days.

(21) Appl. No.: 15/125,790

(22) PCT Filed: Mar. 17, 2015

(86) PCT No.: PCT/JP2015/057877
§ 371 (c)(1),
(2) Date: Sep. 13, 2016

(87) PCT Pub. No.: WO2015/141666
PCT Pub. Date: Sep. 24, 2015

(65) Prior Publication Data
US 2017/0001888 A1 Jan. 5, 2017

(30) Foreign Application Priority Data
Mar. 17, 2014 (JP) .................. 2014-054191

(51) Int. Cl.
*C02F 1/52* (2006.01)
*C02F 1/56* (2006.01)
(Continued)

(52) U.S. Cl.
CPC ............ *C02F 1/5263* (2013.01); *B01D 21/01* (2013.01); *B05B 14/40* (2018.02); *C02F 1/5236* (2013.01);
(Continued)

(58) Field of Classification Search
CPC ...................................................... C02F 1/5236
See application file for complete search history.

(56) References Cited

U.S. PATENT DOCUMENTS

| 4,913,825 A | 4/1990 | Mitchell |
| 4,948,513 A | 8/1990 | Mitchell |
| (Continued) | | |

FOREIGN PATENT DOCUMENTS

| CN | 102084033 A | 6/2011 |
| JP | S52-9968 A | 1/1977 |
| (Continued) | | |

OTHER PUBLICATIONS

China Patent Office, "Office Action for Chinese Patent Application No. 201580014035.3," dated May 5, 2017.
(Continued)

*Primary Examiner* — Peter Keyworth
(74) *Attorney, Agent, or Firm* — Manabu Kanesaka

(57) ABSTRACT

A method for treating a circulating water in a wet paint booth, the method including adding a treatment agent including an aqueous solution including a tannin and an alkali metal hydroxide and/or an alkali metal carbonate to the circulating water in any of passages for the circulating water in the wet paint booth, wherein the passages include for supplying the circulating water from a water tank to a paint booth, for collecting an uncoated paint in the circulating water, and for returning the circulating water to the water tank; to detackify the uncoated paint collected in the circulating water.

9 Claims, 1 Drawing Sheet

(51) Int. Cl.
    *B05B 14/40*     (2018.01)
    *C09D 7/00*     (2018.01)
    *C02F 1/54*     (2006.01)
    *B01D 21/01*     (2006.01)
    *C02F 103/14*     (2006.01)
    *C08K 5/134*     (2006.01)
    *C08K 3/22*     (2006.01)
    *C08K 3/26*     (2006.01)

(52) U.S. Cl.
    CPC .................. *C02F 1/54* (2013.01); *C02F 1/56* (2013.01); *C09D 7/71* (2018.01); *C02F 2103/14* (2013.01); *C02F 2303/22* (2013.01); *C08K 3/22* (2013.01); *C08K 5/1345* (2013.01); *C08K 2003/262* (2013.01)

(56) References Cited

U.S. PATENT DOCUMENTS

| | | |
|---|---|---|
| 5,248,440 A | 9/1993 | Mitchell et al. |
| 5,719,224 A | 2/1998 | Agree et al. |
| 5,977,287 A | 11/1999 | Mitchell et al. |
| 2013/0256224 A1* | 10/2013 | Zhang ................ C02F 9/00 210/620 |

FOREIGN PATENT DOCUMENTS

| | | |
|---|---|---|
| JP | H02-028272 A | 1/1990 |
| JP | H05-269470 A | 10/1993 |
| JP | H08-182901 A | 7/1996 |
| JP | H11-672 A | 1/1999 |
| JP | H11-309304 A | 11/1999 |
| JP | 3116042 B1 | 12/2000 |
| JP | 2006-102619 A | 4/2006 |
| JP | 2011-218257 A | 11/2011 |
| JP | 2012-071272 A | 4/2012 |

OTHER PUBLICATIONS

Europe Patent Office, "Search Report for European Patent Application No. 15765351.0," dated Sep. 27, 2017.
PCT/ISA/210, "International Search Report for International Application No. PCT/JP2015/057877," dated Jun. 23, 2015.

* cited by examiner

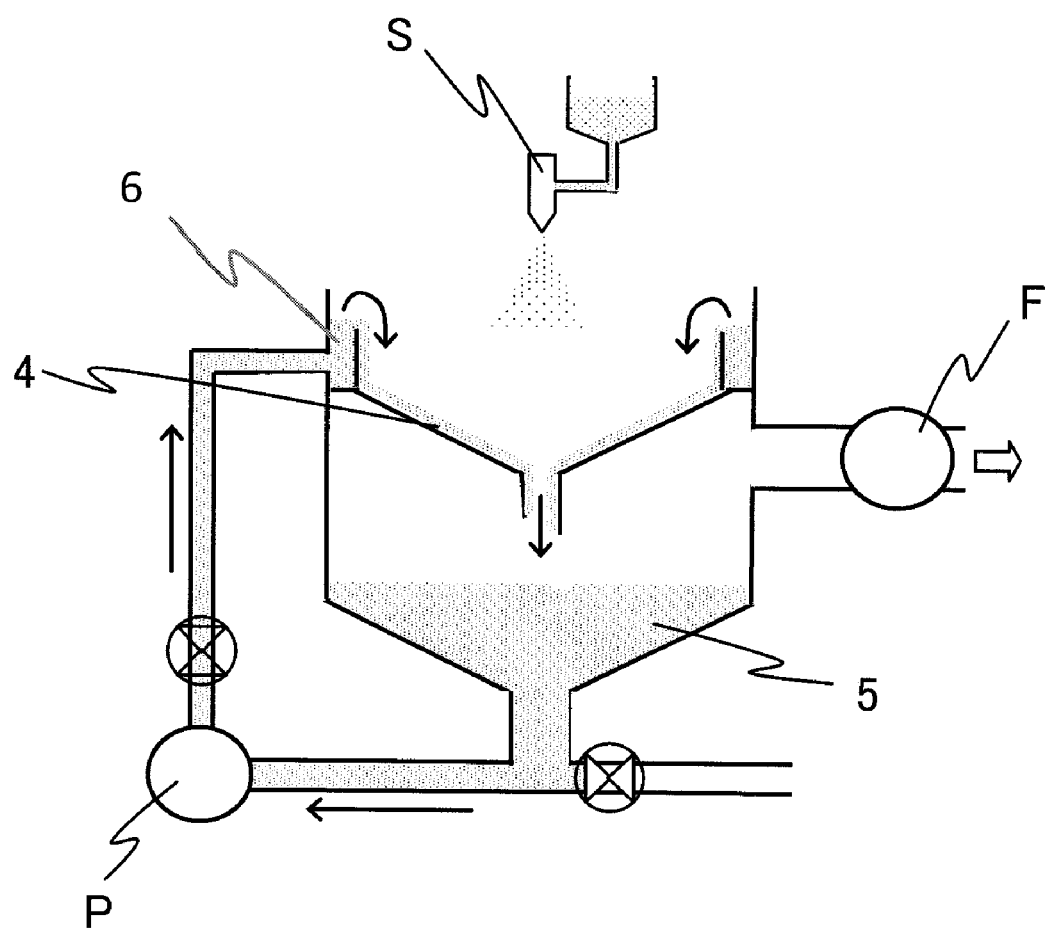

WET PAINT BOOTH CIRCULATING WATER TREATMENT AGENT

RELATED APPLICATIONS

The present application is National Phase of International Application No. PCT/JP2015/057877 filed Mar. 17, 2015, and claims priority from Japanese Application No. 2014-054191, filed Mar. 17, 2014, the disclosure of which is hereby incorporated by reference herein in its entirety.

TECHNICAL FILED

The present invention relates to a treatment agent for a wet paint booth circulating water. More specifically, the present invention relates to a wet paint booth circulating water treatment agent that can reduce tackiness of an uncoated paint collected in a wet paint booth circulating water, and can prevent the uncoated paint from being adhered and solidified onto a water passage inner wall or the like.

BACKGROUND ART

A paint booth is production equipment that is configured in order to emit spray mist and necessary on painting work. Such a paint booth requires a feature of properly exhausting an organic solvent to be generated during spraying work to outdoors, a feature of effectively catching an uncoated paint to be generated by overspray, a feature of generating suitable suction air velocity in order to prevent dust or the like from being adhered onto a coated object for improving painting quality and to protect a health environment for a human body, and the like.

In the wet paint booth, the uncoated paint is collected by a circulating water. The uncoated paint to be collected in the circulating water has high tackiness, and therefore may adhere onto a water screen panel, a pipeline system, a spray nozzle or the like in the paint booth to cause clogging, and to reduce washing efficiency in several cases.

In order to solve such a problem, suggested have been various treatment agents to be added to a circulating water. Examples of the suggestion include a treatment agent comprising an alkaline agent such as caustic soda or the like, zeolite, and a cationic polymer or an amphoteric metal compound (see Patent Literature 1), a treatment agent comprising a combination of an abhesive agent composed of a melamineformaldehyde condensation product and a dispersing agent composed of a bentonite mineral (see Patent Literature 2), a treatment agent comprising an alumina sol and a water-soluble polymer compound (see Patent Literature 3), a treatment agent comprising a polymer composed of a modified tannin compound formed by allowing condensed tannin to react with both an amino compound and an aldehyde under acidic conditions, and a diallyldialkyl quaternary ammonium polymer or a polymer derived from hydrophilic-lipophilic quaternary ammonium repeating units (see Patent Literature 4), and the like.

CITATION LIST

Patent Literatures

Patent Literature 1: JP H11-672 A
Patent Literature 2: JP 2011-218257 A
Patent Literature 3: JP H08-182901 A
Patent Literature 4: JP H02-28272 A
Patent Literature 5: JP H05-269470 A

SUMMARY OF THE INVENTION

Problems to be Solved by the Invention

Incidentally, Patent Literature 3 or 5 discloses an unmodified tannin as one example of an aggregating agent to be simultaneously used with an abhesive agent. Moreover, Patent Literature 2, 4 or 5 discloses a modified tannin as one example of an abhesive agent. However, in the tannin or the modified tannin, an effect of detackifying or flocculating a paint has been unsatisfactory. Moreover, addition of the tannin decreases pH of circulating water, and therefore is easy to cause corrosion of an equipment.

An object of the present invention is to provide a wet paint booth circulating water treatment agent that can reduce tackiness of an uncoated paint collected in a wet paint booth circulating water, and can prevent the uncoated paint from being adhered and solidified onto a water passage inner wall or the like.

Means for Solving the Problems

Studies have been conducted in order to achieve the above-described object, and as a result, the present invention including the following aspects has been completed.
[1] A treatment agent for a wet paint booth circulating water, the treatment agent comprising an aqueous solution comprising a tannin, and an alkali metal hydroxide and/or an alkali metal carbonate.
[2] The treatment agent according to the aspect [1], wherein the tannin is mimosa tannin and/or quebracho tannin.
[3] The treatment agent according to the aspect [1] or [2], wherein pH of the aqueous solution is 10 to 13.
[4] The treatment agent according to any one of the aspects [1] to [3], wherein a tannin concentration in the aqueous solution is 10 to 30% by mass.
[5] A method for treating a circulating water in a wet paint booth, the method comprising
adding the treatment agent according to any one of the aspects [1] to [4] to the circulating water in any of passages for the circulating water in the wet paint booth, wherein the passages include for supplying the circulating water from a water tank to a paint booth, for collecting an uncoated paint in the circulating water, and for returning the circulating water to the water tank, to detackify the uncoated paint collected in the circulating water.
[6] The method according to the aspect [5], for treating the circulating water in the wet paint booth, further comprising adding a coagulant to the circulating water.
[7] The method according to the aspect [5] or [6], for treating the circulating water in the wet paint booth, further comprising adding a polymer flocculant to the circulating water.

Advantageous Effects of the Invention

A treatment agent according to the present invention, even with a low amount of addition, can reduce tackiness of an uncoated paint collected in a wet paint booth circulating water, and can prevent the uncoated paint from being adhered and solidified onto a water passage inner wall or the like, and is hard to cause corrosion of an equipment.

Details of working and effect of detackifying by the treatment agent according to the present invention have not been exactly known yet, but are assumed as described below. Solubility of tannin in water is low at low pH, and high at high pH. In an aqueous solution that composes the treatment agent of the present invention, the tannin is preferably contained in a concentration of 10 to 30% by mass. If the treatment agent is added to the circulating water, pH of the aqueous solution decreases by dilution. The tannin is partially deposited by a decrease of pH. The tannin to be deposited is fine, and has a large specific surface area, and therefore is considered to coat uncoated paint droplets to detackify the droplets.

BRIEF DESCRIPTION OF THE DRAWINGS

FIG. 1 is a conceptual diagram showing one configuration example of a wet paint booth.

EMBODIMENTS FOR CARRYING OUT THE INVENTION

A wet paint booth circulating water treatment agent according to the present invention comprises an aqueous solution comprising a tannin, and an alkali metal hydroxide and/or an alkali metal carbonate.

The tannin to be used in the present invention is a water-soluble compound derived from plant, in which the tannin reacts with protein, alkaloid or metal ion, and is bonded therewith to form a poorly soluble salt. The tannin is broadly classified into condensed tannin (catechol tannin) and hydrolyzable tannin (pyrogallol tannin).

In the condensed tannin, a main component is a polymer of a compound having a phenol skeleton. The condensed tannin is extracted from needle leaf trees/broad leaf trees, such as mimosa, acacia, larch, quebracho, gambier, persimmon or the like. The condensed tannin shows pH of 4.2 to 4.5.

On the other hand, in the hydrolyzable tannin, a main component is an ester of aromatic carboxylic acid. The hydrolyzable tannin is extracted from a dicotyledon such as chestnut, oak, tara, tea, terminalia chebula, rhus chinensis, gallnut or the like. The hydrolyzable tannin shows pH of 2.3 to 4.5. As the tannin to be used in the present invention, condensed tannin is preferred, and mimosa tannin and/or quebracho tannin is further preferred.

The wet paint booth circulating water treatment agent of the present invention is the aqueous solution having a tannin concentration of preferably 10 to 30% by mass, and further preferably 20 to 30% by mass. If the tannin concentration is excessively low, the tannin concentration is low in the form of a finished product and logistic cost is high.

As the alkali metal hydroxide and/or the alkali metal carbonate to be used in the present invention, mentioned can be sodium hydroxide, potassium hydroxide, sodium carbonate, potassium carbonate or the like. A content of the alkali metal hydroxide and/or the alkali metal carbonate in the aqueous solution is in the range in which pH of the aqueous solution is preferably 10 to 13, and further preferably 10.5 to 11.5. If the content of the alkali metal hydroxide and/or the alkali metal carbonate is excessively low, a treatment effect tends to be reduced.

A wet paint booth to which the wet paint booth circulating water treatment agent of the present invention can be applied is not particularly restricted in the type, and may be of a dispersion type or a floating type.

The wet paint booth circulating water treatment agent according to the present invention is added to the circulating water in any of passages for the circulating water in the wet paint booth. The passages include for supplying the circulating water from a water tank to a paint booth, for collecting an uncoated paint in the circulating water, and for returning the circulating water to the water tank. The additive amount of the wet paint booth circulating water treatment agent according to the present invention can be appropriately adjusted according to a state of detackifying of the uncoated paint.

Moreover, the wet paint booth circulating water treatment agent according to the present invention is adhered onto the uncoated paint to cause the detackifying of the uncoated paint, and is discharged outside a system together with paint sludge in a sludge separation process, and therefore is preferably replenished appropriately in the amount corresponding thereto.

It is preferable to add a coagulant to the circulating water together with the wet paint booth circulating water treatment agent according to the present invention. The coagulant has behavior of neutralizing electric charge of fine particles in water to coagulate the fine particles. The coagulant is broadly classified into an organic coagulant and an inorganic coagulant.

Examples of the organic coagulant include sodium alginate; a chitin-chitosan coagulant; a biocoagulant such as TKF04 strain, BF04 strain or the like; a cationic polymer coagulant such as polyethyleneimine, cation-modified polyacrylamide, polyamine, polyamine sulfone, polyamide, polyalkylene-polyamine, an amine-crosslinked polycondensate, polydimethylaminoethylacrylate, dimethyldiallylammonium chloride, a condensation product of alkylamine and epichlorohydrin, a condensation product of alkylene dichloride and polyalkylene polyamine, a condensation product of dicyandiamide and formalin, DAM (homopolymer or copolymer comprising dimethylaminoethyl methacrylate), and the like. The cationic polymer coagulant is composed of a cationic polymer having a weight average molecular weight of preferably not less than one thousand and not more than one million, and further preferably not less than five thousand and not more than 0.3 million, for example.

Examples of the inorganic coagulant include an aluminum coagulant such as aluminum sulfate (alum), polyaluminum chloride (PAC), polyaluminum hydroxychloride, a quasi boehmite alumina sol (AlO(OH)) or the like; an iron salt coagulant such as ferrous hydroxide, ferrous sulfate, ferric chloride, polyferric sulfate, an iron-silica inorganic-polymer coagulant or the like; a zinc coagulant such as zinc chloride or the like; active silica, a polysilica-iron coagulant, and the like.

The amount of the coagulant to be added to the circulating water can be appropriately adjusted according to a formation state of aggregated flocs of the uncoated paint. The amount of the coagulant to be added to the circulating water is preferably 0.01 to 30 parts by mass, and further preferably 0.5 to 20 parts by mass, based on 100 parts by mass of the tannin.

When the cationic polymer coagulant is used, the additive amount thereof is preferably 0.01 to 20 parts by mass, and further preferably 0.5 to 10 parts by mass, relative to 100 parts by mass of the tannin. Moreover, the additive amount of the cationic polymer coagulant is preferably 0.001 to 1 meq/L, and further preferably 0.002 to 0.5 meq/L in terms of a colloid equivalent amount relative to the circulating water, for example.

When the inorganic coagulant is used, the additive amount thereof is preferably 0.01 to 100 parts by mass, and further preferably 1 to 50 parts by mass in terms of a metal oxide relative to 100 parts by mass of the tannin.

It is preferable to flocculate the aggregated flocs of the uncoated paint obtained by the behavior of the coagulant from a viewpoint of facilitating precipitation and centrifugation so as to form coarse flocs.

In the present invention, a polymer flocculant can be further added to the circulating water in order to form the coarse flocs. The polymer flocculant comprises an anionic polymer, a cationic polymer or an amphoteric polymer. Such a polymer has a weight average molecular weight of usually more than one million, and preferably not less than five million.

Examples of the polymer flocculant comprising an anionic polymer include sodium polyacrylate, a sodium polyacrylate-amide derivative, a partially hydrolyzed polyacrylamide, partially sulfomethylated polyacrylamide, poly(2-acrylamide)-2-methylpropane sulfate and the like.

Examples of the polymer flocculant comprising a cationic polymer include polyaminoalkylacrylate, polyaminoalkylmethacrylate, polyethyleneimine, halogenated polydiallyl ammonium, chitosan, a urea-formalin resin and the like.

Examples of the polymer flocculant comprising an amphoteric polymer include a copolymer of acrylamide, aminoalkyl methacrylate and sodium acrylate and the like.

The additive amount of the polymer flocculant can be appropriately adjusted according to a formation state of the coarse flocs. The additive amount of the polymer flocculant is preferably 0.01 to 20 parts by mass, and further preferably 0.5 to 10% by weight, relative to 100 parts by mass of the tannin, for example. Moreover, the additive amount of the polymer flocculant is preferably 0.001 to 1 meq/L, and further preferably 0.002 to 0.5 meq/L in terms of the colloid equivalent amount relative to the circulating water, for example.

Supplementary abhesives can be added to the circulating water together with the wet paint booth circulating water treatment agent according to the present invention. Examples of the supplementary abhesives include an alumina sol, sepiolite, a melamine-formaldehyde resin, a phenol-formaldehyde resin, bentonite, hectorite, linear cationic polyamine, sodium plumbite and the like.

The aggregated flocs or the coarse flocs formed by the above-described method are separated and removed from the circulating water by a publicly known method. Thus, clarification of water that circulates in the wet paint booth can be achieved.

EXAMPLES

Next, the present invention is more specifically described by giving Examples and Comparative Examples. However, the following Examples only state one embodiment according to the present invention, and the present invention is not limited to the following Examples.

[Detackifying of Water Base Paint]

Example 1

A water treatment agent A composed of an aqueous solution comprising 10% of mimosa tannin and 1.6% of NaOH was prepared. The water treatment agent A had very little odor and had pH of 10.4.

In a 500 mL bottle, 0.03 mL of 50% solution of an alkylamine-epichlorohydrin condensation product (hereafter, written as a coagulant A), 300 mL of tap water, 1 mL of water base silver paint for automotive body and 0.3 mL of the water treatment agent A were fed, and a lid was put on, and the bottle was shaken 60 times per 30 seconds.

The resulting treated water had pH of 7.9, and an electric charge of −0.020 meq/L.

—Foamabilities—

All of the treated water was put in a 1 L measuring cylinder, and an aeration ball was placed on a bottom in the measuring cylinder, and air was supplied at 1.5 L/min to allow bubbling. A foam volume at 2 minutes from the start of the bubbling, or the time in seconds that elapsed before the foam volume reaches 700 mL was measured.

The bubbling was stopped when the foam volume reached 700 mL or when 2 minutes elapsed from the bubbling start. The foam volume at 2 minutes from the stop of the bubbling and the time in minutes that elapsed before the foam completely disappeared were measured.

—Turbidity—

The treated water was subjected to filtration using a Whatman No. 41 filter paper (particle retention capability: 20 to 25 microns). Turbidity of the obtained colature was measured.

—Secondary Flocculability—

To the treated water, 1 mL of 1% diluted solution of an emulsion polymer flocculant (containing acrylamide-2-(acryloyloxy)ethyltrimethyl ammonium chloride copolymer) was added. A secondary flocculation state was observed. A case where floc diameter was not less than 1 mm was evaluated as "good," and a case where floc diameter was less than 1 mm was evaluated as "poor."

The test results are shown in Table 1. In addition, in treatment of water containing a water base paint, it is preferable to be low turbidity and low foamability.

Comparative Example 1

A treatment agent E composed of an aqueous solution comprising 10% of mimosa tannin was prepared. The treatment agent E had pH of 4.8.

A treated water was obtained in the same manner as in Example 1 except that the treatment agent A was changed to the treatment agent E, and the amount of the coagulant A was changed to 0.02 mL. The treated water was evaluated for pH, electric charge, foamabilities, turbidity and secondary flocculability. The results are shown in Table 1. Meanwhile, the volume reduction of the coagulant A was for keeping the electric charge conditions in line with Example 1.

Comparative Example 2

A treated water was obtained in the same manner as in Example 1 except that the treatment agent A was changed to the treatment agent E, and 0.1 mL of 2.5% NaOH aqueous solution was further added. The treated water was evaluated for pH, electric charge, foamabilities, turbidity and secondary flocculability. The results are shown in Table 1. Meanwhile, the addition of 2.5% NaOH aqueous solution was for keeping the pH and the electric charge conditions in line with Example 1.

Comparative Example 3

A treated water was obtained in the same manner as in Example 1 except that the amount of the treatment agent A was changed to zero, and the amount of the coagulant A was changed to zero. The treated water was evaluated for pH, electric charge, foamabilities, turbidity and secondary flocculability. The results are shown in Table 1.

TABLE 1

| | treatment agent | pH | electric charge [meq/l] | foam volume at 2 min. from bubbling start [ml] | Time before 700 ml-foam appearance [sec] | foam volume at 2 min. from bubbling stop [ml] | Time before foam disappearance [min] | turbidity [deg] | flocculability |
|---|---|---|---|---|---|---|---|---|---|
| Ex.1 | A | 7.9 | −0.020 | 500 | — | 100 | 30 | 8 | Good |
| Comp. Ex. 1 | E | 7.2 | −0.035 | 400 | — | 80 | 30以上 | 33 | Good |
| Comp. Ex. 2 | E + NaOH | 7.9 | −0.014 | 700以上 | 55 | 100 | 30以上 | 26 | Good |
| Comp. Ex. 3 | — | 7.4 | −0.100 | 700以上 | 55 | 200 | 30以上 | 100以上 | Poor |

The results described above indicate the following. That is, the treatment agent (Example 1) according to the present invention can effectively achieve clarification of water. Moreover, the resulting treated water has low foamability and fast defoaming.

In contrast, the tannin aqueous solution (Comparative Example 1 or 2) being the conventional technique cannot achieve sufficient clarification of water. Moreover, the resulting treated water has slow defoaming.

Example 2

A treatment agent B composed of an aqueous solution comprising 22% of quebracho tannin and 4.8% of NaOH was prepared. The treatment agent B has pH of 10.8.

A treatment agent B' composed of an aqueous solution comprising 10% of quebracho tannin and 1.6% of NaOH was prepared. The treatment agent B' had very little odor. The treatment agent B or B' is considered to be comparable to the treatment agent A in a detackifying effect.

Example 3

A treatment agent C composed of an aqueous solution comprising 10% of acacia tannin and 1.6% of NaOH was prepared. The treatment agent C had a strong ammonia-like odor. The treatment agent C is considered to be comparable to the treatment agent A in a detackifying effect, but to be lower than the treatment agent A in operability because of the odor.

[Detackifying of Solvent Base Paint]
(Wet Paint Booth)

An outline of a wet paint booth is described with reference to FIG. 1. The wet paint booth shown in FIG. 1 had a paint spray gun S installed in an upper portion, and was configured so as to spray a paint at 5 g/min. A circulating water was stored in a pit 5 (water tank: the total volume of the circulating water was 50 L). The circulating water can be pumped up at 100 L/min by a pump P, and the circulating water can be flowed on a water screen panel 4 in a curtain form, and can be returned to the pit. In a treating agent supply portion 6, a treatment agent, a coagulant or a polymer flocculant can be added to the circulating water. Moreover, a volatile matter such as a solvent vapor can be sucked out of the booth by an exhaust fan F.

Example 4

Operations were carried out in the wet paint booth shown in FIG. 1. First, 10 mL of the treatment agent A and 0.6 mL of the coagulant A were added to a circulating water from a treating agent supply portion 6, and the circulating water was circulated by a pump so as to uniformly distribute the treatment agent A and the coagulant A in the circulating water. A solvent base middle coat gray paint for automotive body was sprayed from a paint spray gun S at 5 g/min. Spraying was stopped when 4 minutes elapsed.

After stopping the spraying, pH and electric charge of the circulating water were measured. Moreover, tackiness of sludge floated on a surface of the circulating water accumulated in a pit was evaluated by the following criteria by finger touch.

A: No tackiness
B: No tackiness, but easily solidified if kneaded
C: Slightly tacky
D: Significantly tacky The results are shown in Table 2.

Comparative Example 4

Spraying was performed in the same manner as in Example 4 except that the treatment agent A was changed to the treatment agent E, and 3 mL of a 2.5% NaOH aqueous solution was further added.

After stopping the spraying, pH and electric charge of the circulating water were measured. Moreover, tackiness of sludge floated on a surface of the circulating water accumulated in a pit was evaluated by criteria same with the criteria in Example 4 by finger touch. The results are shown in Table 2.

Comparative Example 5

Spraying was performed in the same manner as in Example 4 except that the amount of the treatment agent A was changed to zero, and the amount of the coagulant A was changed to zero. After stopping the spraying, pH and electric charge of the circulating water were measured. Moreover, tackiness of sludge floated on a surface of the circulating water accumulated in a pit was evaluated by criteria same with the criteria in Example 4 by finger touch. The results are shown in Table 2.

Example 5

Operations were carried out in the wet paint booth shown in FIG. 1. First, 4.8 mL of the treatment agent B was added from a treating agent supply portion 6, and circulating water was circulated by a pump so as to uniformly distribute the treatment agent B in the circulating water. A solvent base white paint for automotive body was sprayed from a paint spray gun S at 5 g/min. Then, spraying was stopped when 4 minutes elapsed.

After stopping the spraying, pH and electric charge of the circulating water were measured. Moreover, tackiness of sludge floated on a surface of the circulating water accumulated in a pit was evaluated by criteria same with the criteria in Example 4 by finger touch. The results are shown in Table 2.

Comparative Example 6

Spraying was performed in the same manner as in Example 5 except that the amount of the treatment agent B was changed to zero.

After stopping the spraying, pH and electric charge of the circulating water were measured. Moreover, tackiness of sludge floated on a surface of the circulating water accumulated in a pit was evaluated by criteria same with the criteria in Example 4 by finger touch. The results are shown in Table 2.

TABLE 2

|  | Paint | Treatment agent | pH | electric charge [meq/l] | Tackiness |
|---|---|---|---|---|---|
| Ex. 4 | Gray | A | 7.41 | −0.005 | B |
| Comp. Ex. 4 | Gray | E + NaOH | 7.44 | 0.005 | C |
| Comp. Ex. 5 | Gray | — | 7.40 | 0~−0.005 | D |
| Ex. 5 | White | B | 7.80 | −0.08 | A |
| Comp. Ex. 6 | White | — | 7.70 | −0.005 | D |

The results described above indicate that an alkali solution of tannin (Examples 4 and 5) have a higher effect on suppressing the tackiness in comparison with the tannin aqueous solution (Comparative Example 4) in detackifying treatment of the solvent paint.

EXPLANATION OF SYMBOLS

S: Paint spray
F: Exhaust fan
P: Circulating water pump
4: Water screen panel
5: Water tank
6: Treating agent supply portion

The invention claimed is:

1. A method for treating a circulating water in a wet paint booth, the method comprising:
    adding a treatment agent to the circulating water somewhere along a passage for the circulating water,
    wherein, the circulating water is supplied from a water tank to a paint booth for collecting an uncoated paint and is returned to the water tank in the passage,
    the treatment agent consists essentially of an aqueous solution comprising an alkali metal hydroxide and/or an alkali metal carbonate, a tannin and water,
    the aqueous solution has a pH of 10 to 13,
    a tannin concentration in the aqueous solution is 10 to 30% by mass, and
    the tannin has a solubility in water such that as a pH in water becomes higher, the solubility of the tannin in water becomes higher,
    whereby a part of the tannin in a mixture of the circulating water and the treatment agent obtained by the adding the treatment agent to the circulating water is precipitated due to decreased pH of the aqueous solution by dilution of the treatment agent with the circulating water, and the obtained precipitate of the tannin detackifies the uncoated paint collected in the circulating water.

2. The method according to claim 1, further comprising adding a coagulant to the circulating water.

3. The method according to claim 1, further comprising adding a polymer flocculant to the circulating water.

4. The method according to claim 2, further comprising adding a polymer flocculant to the circulating water.

5. The method according to claim 1, wherein the tannin is mimosa tannin and/or quebracho tannin.

6. The method according to claim 1, wherein the passage includes the water tank, the paint booth, a path from the water tank to the paint booth, and a path from the paint booth to the water tank.

7. The method according to claim 1, wherein the tannin is a condensed tannin and/or a hydrolyzable tannin obtained from wood and/or vegetation materials.

8. The method according to claim 2, wherein the coagulant has behavior of neutralizing electric charge of fine particles in water to coagulate the fine particles.

9. The method according to claim 3, wherein the polymer flocculant comprises an anionic polymer, a cationic polymer, or an amphoteric polymer.

* * * * *